US 8,361,618 B2
Jan. 29, 2013

(12) United States Patent
Rockenfeller et al.

(54) REFRIGERANT RELEASING COMPOSITE

(75) Inventors: Uwe Rockenfeller, Boulder City, NV (US); Kaveh Khalili, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 352 days.

This patent is subject to a terminal disclaimer.

(21) Appl. No.: 12/771,616

(22) Filed: Apr. 30, 2010

(65) Prior Publication Data

US 2010/0269539 A1 Oct. 28, 2010

Related U.S. Application Data

(63) Continuation-in-part of application No. 11/029,686, filed on Jan. 4, 2005, now Pat. No. 7,722,952.

(51) Int. Cl.
*B32B 7/00* (2006.01)
*B32B 5/14* (2006.01)

(52) U.S. Cl. ........ 428/380; 428/364; 428/381; 428/395; 428/396; 442/135; 442/138

(58) Field of Classification Search ............ 62/529
See application file for complete search history.

(56) References Cited

U.S. PATENT DOCUMENTS

| | | | |
|---|---|---|---|
| 4,311,630 A | 1/1982 | Humphrey et al. | |
| 4,351,878 A | 9/1982 | Harper-Tervet et al. | |
| 6,224,842 B1 | 5/2001 | Rockenfeller et al. | |
| 6,736,194 B2 | 5/2004 | Rockenfeller et al. | |
| 8,124,547 B2 * | 2/2012 | Rockenfeller et al. | .......... 442/86 |
| 2006/0147691 A1 | 7/2006 | Rockenfeller et al. | |

OTHER PUBLICATIONS

Restriction Requirement dated Mar. 19, 2008 in U.S. Appl. No. 11/029,685.
Office Action dated May 20, 2008, in U.S. Appl. No. 11/029,685.
Final Office Action dated Nov. 26, 2008 in U.S. Appl. No. 11/029,685.
Advisory Action dated Feb. 5, 2009 in U.S. Appl. No. 11/029,685.
Office Action dated Apr. 14, 2009 in U.S. Appl. No. 11/029,685.
Department of Defense Handbook: Composite Materials Handbook, vol. 1, Ch. 3, pp. 2-3 Jun. 17, 2002.

* cited by examiner

*Primary Examiner* — Maria Veronica Ewald
*Assistant Examiner* — Prashant J Khatri
(74) *Attorney, Agent, or Firm* — Knobbe, Martens, Olson & Bear LLP

(57) ABSTRACT

A composite configured to release refrigerant therefrom comprises a substrate material comprising polarized fibers of glass, polyamide, phenylene sulfide, carbon or graphite or combinations of two or more thereof having bonded thereon a metal compound comprising a complex compound of a polar gaseous refrigerant and a metal salt and/or a hydrated metal hydroxide and/or a metal hydroxide of a metal comprising alkali metal, alkaline earth metal, transition metal, zinc, cadmium, tin, aluminum, or two or more thereof, at a concentration of at least about 0.3 grams/cc of open substrate material volume, and a coating composition sealing one or more layers of the substrate and/or the exterior composite surface configured to prevent release of internal gaseous refrigerant therethrough at ambient temperatures and pressure and capable of penetration of gaseous refrigerant therethrough from the composite interior at temperatures causing internal gas pressures of 15% or more above exterior pressure for such refrigerant release.

22 Claims, No Drawings

REFRIGERANT RELEASING COMPOSITE

CROSS-REFERENCE TO RELATED APPLICATIONS

This application is a continuation-in-part of U.S. patent application Ser. No. 11/029,686 filed Jan. 4, 2005.

BACKGROUND OF THE INVENTION

Materials presently available for protecting vehicles, ammunition, solid, liquid or gaseous fuels, rockets, missiles and/or personnel from small arms projectile penetration or penetration from flying shrapnel, fire, directed energy, explosions and associated heat and the like are relatively expensive. Moreover, such materials do not have self cooling and/or fire extinguishing properties. The composites described herein are relatively inexpensive and cost-effective to manufacture, may be produced in almost any shape, size and thickness, and are recyclable. The composites are configured to release gaseous refrigerant at temperatures above about 150° F. and preferably much higher temperatures, thereby providing cooling and fire extinguishing properties. The composites have mechanical and structural integrity and may be used in conjunction with penetration resistant materials or, in some cases, can be designed to provide some penetration resistance.

SUMMARY OF THE INVENTION

The preferred composites described herein comprise a substrate material comprised of woven, layered or intertwined polarized strands of glass, polyamide, polyphenylene sulfide, carbon or graphite fibers on which a metal compound comprising a coordinated complex compound of a polar gas refrigerant and sorbent comprising a metal salt or a metal hydroxide is polar bonded on the surface of the fibers and/or strands at concentrations sufficient to form bridges of the metal compound between adjacent substrate strands and/or substrate fibers. Single or multiple layers of the metal compound bonded fibers are coated with a coating material capable of preventing release or escape or increase in concentration (e.g. water) of the internal gaseous refrigerant at external atmospheric or ambient pressure but which is capable of allowing penetration of the refrigerant at internal refrigerant pressures resulting in total internal pressure of at least about 15% or more above exterior atmospheric/ambient pressure. Panels comprising laminates or other shaped geometries may be produced using composite layers. When heat is imposed on the composite via fire, explosion, directed energy, combustion of gasoline, oil, other liquid or gaseous or solid fuels, rocket fuel or by a projectile breaching the exterior coating, causing a temperature increase of the bonded metal compound and a resulting increase in internal composite pressure, the composite releases refrigerant. Such refrigerant release will cool the composite and may prevent ignition of protected contents and/or personnel or extinguish a flame. Panels comprising multiple layers having different sorbents and/or different refrigerants with different refrigerant release temperature/pressure ranges may be produced to achieve thermal gradient refrigerant release at selected temperatures.

DETAILED DESCRIPTION OF PREFERRED EMBODIMENTS

The unique refrigerant releasing composite products described herein are preferably fabricated from a substrate material comprising preferably woven or intertwined polarized strands or layered strands of the substrate. Such woven or intertwined substrate material incorporate or utilize elongated or continuous fibers such as fabrics or cloth or unwoven intertwined fiber materials such as yarn, rope or the like where the fibers or strands of fibers have been twisted or formed in a coherent form such as yarn or weaves of strands. Various or different weaving patterns may be used, preferably three-dimensional weaves which yield multi-directional strength characteristics as compared to two-dimensional weaves having anisotropic strength characteristics. The preferred substrate utilizes elongated and/or continuous fibers or filaments as opposed to chopped or loose fibers or strands in which there is no interlocking or structural pattern to the fibrous substrate in order to achieve good mechanical strength. However, non-woven fibers including mat, batting, felt or chopped or loose fiber materials are useful for the purpose of refrigerant release composites, but offer less mechanical strength or penetration protection. Suitable materials also include needle woven layers of substrate fiber strands. Alternatively, layers of elongated, substantially continuous fiber strands which have not been woven in a three-dimensional weave may be used. Successive layers of the fibers are preferably positioned along different axes so as to give the substrate strength in multiple directions. Moreover, such layers of non-woven fibers can be positioned between layers of woven fibers.

The substrate material of which the fiber strands are made include glass, polyamide, polyphenylene sulfide, carbon or graphite fibers. Glass fibers are a preferred fiber material, woven glass fibers being relatively inexpensive and woven glass fiber fabric easy to handle and process in preparing the composites. The glass fibers may be E-glass and/or S-glass, the latter having a higher tensile strength. Glass fiber fabrics are also available in many different weaving patterns which also makes the glass fiber material a good candidate for the composites. Carbon and/or graphite fiber strands may also be used. Polyamide materials or nylon polymer fiber strands are also useful, having good mechanical properties. Aromatic polyamide resins (aramid resin fiber strands, commercially available as Kevlar® and Nomex®) are also useful. Yet another useful fiber strand material is made of polyphenylene sulfide, commercially available as Ryton®. Combinations of two or more of the aforesaid materials may be used in making up the substrate, with specific layered material selected to take advantage of the unique properties of each of them. The substrate material, preferably has an open volume of at least about 30%, and more preferably 50% or more, up to about 95%. The specific substrate material selected and used as well as the percentage of open volume may depend on the expected uses, including environmental exposure conditions, substrate melting temperatures, and the like.

The surface of the fibers and fiber strands of the aforesaid substrate material must be sufficiently polarized to at least provide some bonding between the fiber and the absorbent crystals adequate to achieve the below loading densities. Polarized fibers are commonly present on commercially available fabrics, weaves or other aforesaid forms of the substrate. If not, the substrate may be treated to polarize the fiber and strand surfaces. The surface polarization requirements of the fiber, whether provided on the substrate by a manufacturer, or whether the fibers are treated for polarization, must be sufficient to achieve a loading density of the metal salt or hydroxide on the fiber of at least about 0.3 grams per cc of open substrate volume whereby the bonded metal compound bridges at least some adjacent fiber and/or adjacent strands of the substrate. Polarity of the substrate material may be readily determined by immersing or otherwise treating the substrate with a solution of the salt or hydroxide, drying the material and determining the weight of the metal compound polar bonded to the substrate. Alternatively, polar bonding may be determined by optically examining a sample of the dried substrate material and observing the extent of metal compound bridging of adjacent fiber and/or strand surfaces. Even prior to such bonding determination, the substrate may be examined to see if excessive oil or lubricant is present on the surface. Oil coated material will substantially negatively affect the ability of the substrate fiber surfaces to form an ionic, polar bond with a metal salt or metal hydroxide. If excessive surface oil is present, the substrate may be readily treated, for example, by heating the material to sufficient temperatures to burn off or evaporate most or substantially all of the undesirable lubricant. Oil or lubricant may also be removed by treating the substrate with a solvent, and thereafter suitably drying the material to remove the solvent and dissolved lubricant. Substrates may also be treated with polarizing liquids such as water, alcohol, inorganic acids, e.g., sulfuric acid.

The substrate may be electrostatically charged by exposing the material to an electrical discharge or "corona" to improve surface polarity. Such treatment causes oxygen molecules within the discharge area to bond to the ends of molecules in the substrate material resulting in a chemically activated polar bonding surface. Again, the substrate material should be mostly free of oil prior to the electrostatic treatment.

A sorbent for the polar gas refrigerant comprising metal salt, or metal hydroxide, is bonded to the surface of the polarized substrate material by impregnating, soaking, spraying, flowing, immersing or otherwise effectively exposing the substrate surface to the metal compound. A preferred method of bonding the sorbent to the substrate is by impregnating, soaking, or spraying the material with a liquid solution, slurry or suspension or mixture containing the metal salt or hydroxide followed by removing the solvent or carrier by drying, heating and/or by applying a vacuum. The substrate may also be impregnated by pumping a salt or hydroxide suspension, slurry or solution or liquid-salt mixture into and through the material. Where the liquid carrier is a solvent for the salt, it may be preferred to use a saturated salt solution for impregnating the substrate. However, for some cases, lower concentrations of salt or hydroxide may be used, for example, where necessitated or dictated to meet permissible loading densities. Where solubility of the salt or hydroxide in the liquid carrier is not practical or possible, substantially homogeneous dispersions may be used. Where an electrostatically charged substrate is used, the salt or hydroxide may be bonded by blowing or dusting the material with dry salt or hydroxide particles.

As previously described, it is necessary to bond a sufficient amount of metal salt or metal hydroxide on the substrate to achieve at least some bridging of the salt or hydroxide crystal structure between adjacent fibers and/or strands. A sufficient amount of salt or hydroxide is provided by at least about 0.3 grams per cc of open substrate volume, preferably at least about 0.4 grams per cc, and most preferably at least about 0.5 grams per cc of open substrate volume, which is between about 30% and about 95% of the untreated substrate volume, and preferably between about 50% and about 95%. Following the aforesaid treatment, the material is dried in equipment and under conditions to form a flat layer, or other desired size and shape using a mold or form. A dried substrate will readily hold its shape. Unless the solvent is also the refrigerant, drying to substantially eliminate the solvent, carrier fluid or other liquid is necessary, although small amounts of fluid, for example, up to 1-2% of solvent, can usually be tolerated without detriment to the strength or refrigerant holding capacity of the material. Drying and handling techniques for such solvent removal will be understood by those skilled in the art. If the solvent is also the refrigerant, the solvent removal may be stopped at the desired level of refrigerant content. The most preferred refrigerants are water and ammonia.

Typical mass percentages of refrigerant mass per dry sorbent mass are between about 5% and about 80%. Hydroxides commonly do not absorb ammonia and are limited to water refrigerant of just one or a few moles of water per mole of hydroxide. Exposure of these compounds to heat causes a rise in refrigerant pressure and can be employed to release the refrigerant in the typically endothermic process. Heats of reaction range form about 35 kJ/mol ammonia for relatively high vapor pressure ammoniated complex compounds to over 70 kJ/mol water for hydrated complex compounds and select ammoniated compounds and even higher for hydroxide hydrates and even higher for the reduction of hydroxides into oxides, such heats of reaction absorbing often over 100 kJ/mol of water.

Metal salts or hydroxides bonded to the substrate are alkali metal, alkaline earth metal, transition metal, zinc, cadmium, tin, aluminum, double metal salts of the aforesaid metals, and/or mixtures of two or more of the metal salts. The salts of the aforesaid metals are halide, nitrite, nitrate, oxalate, perchlorate, sulfate or sulfite. The preferred salts are halides, and preferred metals are strontium, magnesium, manganese, iron, cobalt, calcium, barium and lithium. The aforesaid preferred metal salts provide molecular weight/electrovalent (ionic) bond ratios of between about 40 and about 250.

Unless the solvent is identical to the refrigerant and was intentionally retained during the drying process, to form a coordinated complex compound of a bonded metal salt or hydroxide and a polar gaseous refrigerant, the substrate material having the bonded metal salt or hydroxide (sorbent) formed as previously described is treated with the selected gaseous refrigerant which becomes absorbed on the sorbent. Such absorption reactions and the coordinated complex compounds are described in substantial detail in U.S. Pat. Nos. 5,298,231, 5,441,716 and 6,224,842, the descriptions of which are incorporated herein by reference. The preferred polar gas to be absorbed onto the metal salt to form the compound is selected from ammonia and water. Other ligands, such as amines and alcohols are also possible, but usually less desirable due to their flammability and low heat of reaction resulting in a lesser cooling effect. Phosphine is another polar gaseous refrigerant that may be used in special circumstances because of its toxicity. The specific polar gas refrigerant to be absorbed on the specific sorbent will depend on the temperature range desired to trigger or initiate release of the polar gas to achieve the desired cooling effect on the composite at the time it is exposed to heat by fire, explosion, directed energy, fuel combustion or is hit by a bullet, shrapnel or other invasive material causing a temperature rise. For example, to extinguish a flame, water may be the preferred refrigerant to be released by the composite. When metal hydroxides are used water is the only practical refrigerant forming the related hydrates and with the additional release at the highest temperature converting the hydroxide into the corresponding oxide. However, complex compounds with water as the polar refrigerant and hydrated metal hydroxides commonly release water at higher temperatures compared to the temperatures at which more volatile refrigerants such as ammonia or amines are released. Where it is desired for relatively low temperature refrigerant release, for example, between about 150° F.-400° F., ammonia refrigerant is useful, whereby the ammoniated complex compounds as previously described may be used. Because different ammoniated complex compounds will release (desorb) ammonia at different temperatures, the specific metal salt (sorbent) as well as the coordination step of the ammoniated complex compound may be selected depending on the desired refrigerant release temperature. For higher temperature refrigerant release, for example, in the temperature range between about 200° F.-800° F., water may be the refrigerant absorbed on the metal salts to form the complex compounds. Complex compounds of different metal salts and water will release water at different temperatures as will complex compounds of one metal salt having different water coordination spheres or steps. Thus, the specific absorbents and/or refrigerants and/or complex compound coordination steps may be selected depending on the specific refrigerant release temperature range desired. For yet higher temperatures, the release of water from a hydrated metal hydroxide may be used, e.g., sodium, calcium or lithium hydroxide hydrates. For example, hydrated metal hydroxides may release water at temperatures above 300° F. up to 1,000° F. At even higher temperatures, metal hydroxides may release water by converting to the corresponding oxide at temperatures up to about 2,000° F. Some hydroxides, however, will melt at or below 2000° F. thus likely releasing water.

As described, since refrigerants are released at different temperature ranges depending on their ligand sphere or chemical bond, it may be desirable to form a composite having different layers or laminates of layers of metal compounds using the same or different refrigerants having selected different absorbents yielding different ligand coordinating complex compounds, or other metal compounds such as hydroxides. For example, different ammoniated complex compounds and/or different hydrated complex compounds and/or hydroxides and/or hydrated hydroxides may be used in different layers of a composite. Moreover, the composite may be configured so that successively higher (or lower) temperature refrigerant release complex compounds and/or hydroxides are used in successive layers of the composite structure. It may also be desirable to utilize different refrigerants in different successive layers of the compounds so as to achieve a selected successive release of refrigerants at progressively higher temperatures. Such composites comprise multiple layers with two or more different layers and two or more different metal compounds. Such different metal compounds are selected from different complex compounds comprising different metal salts with one refrigerant, different metal salts with different refrigerants, one metal salt with different refrigerants or one metal salt with different coordination spheres of one refrigerant; hydrated metal hydroxides; and metal hydroxides. A composite having combinations of the aforesaid metal compounds, e.g., between two and six different metal compounds, may be used to release refrigerants at any number of different successive temperatures. Thus, such composites having selected thermal profile or thermal refrigerant gradient may release refrigerant gas or gases at controllable conditions to provide cooling and extinguish flame at such selected different specific trigger temperature/pressure conditions. Preferred composites for such progressive temperature refrigerant release will incorporate an ammoniated complex compound and/or a hydrated complex compound, and/or a hydrated metal hydroxide, and/or a metal hydroxide. The benefits of such an effect, whether using different refrigerants, different sorbents or both at such different and progressive temperatures, or using a single refrigerant composite, will be evident. For example, containers, cylinders, boxes or cases made from such a composite may be used for protecting many kinds of ordnance or other valuable and/or fragile material such as ammunition, fuel and missiles as well as personnel.

Where the metal compound is an ammoniated complex compound of the aforesaid salts, and which are listed in U.S. Pat. No. 5,441,716, the degree of coordination is important in that it determines the cooling energy density potential as well as the mechanical ruggedness and integrity of the composite. Higher degrees of ammoniation tend to reduce the mechanical ruggedness and strength and the composites capability to serve as armor or protective matter. Where a greater amount of refrigerant is desired, a higher coordinated step product may be used, and for a reduced quantity of refrigerant, a lower coordination step may be suitable. The same holds true for complex compounds in which the refrigerant is other than ammonia. Similarly, where the refrigerant is water, and a hydrate is used, the amount of hydration may be selected to achieve the desired amount of water vapor available when the refrigerant is released. However, hydrates are more susceptible to losing mechanical integrity and strength with increased hydration level. The compromise between cooling energy density and mechanical strength and protective characteristics of the composite needs to be more carefully evaluated for each application than for ammoniated compounds.

If not previously sized, the material is cut to form layers of a desired size and/or shape, and each layer of metal compound bonded substrate material or multiple layers thereof are sealed by coating with a composition capable of preventing the penetration of gaseous refrigerant from the composite through the coating at ambient/atmospheric temperature and pressure and preventing water absorption by exposure to ambient atmospheric conditions, but which is capable of refrigerant penetration and release at a temperature increase that causes internal refrigerant partial pressure increase resulting in total internal pressure above exterior atmospheric or ambient pressure sufficient for the refrigerant to penetrate the coating. Typically, such total internal pressure will result in total pressures exceeding atmospheric pressure by about 15% or more. The coating step should be carried out under conditions or within a time so as to substantially seal the composite thereby preventing the complex compound or hydrated metal compound from deterioration by being exposed to atmospheric conditions which could cause liquefaction and/or loss of the salt bond and structural integrity of the product. As previously stated, the coating composition must be capable of preventing premature release of gaseous refrigerant from the composite at ambient temperatures and ambient atmospheric pressure. However, the coating composition must also allow for release and penetration of the refrigerant when the internal pressure of the composite is increased above the atmospheric/ambient pressure such as caused by the composite exposed to heat from fire, explosives, fuel combustion or caused by impact from shrapnel, bullets, projectiles, or other such events causing internal compound temperature and related pressure increase and resulting in the complex compound or metal hydroxide releasing the bonded refrigerant from the composite structure. The breached coating may vaporize, melt, fracture or otherwise become porous to the gaseous refrigerant released by the metal compound previously protected by the coating composition. Such coating must be configured to allow for such release or penetration of the gaseous refrigerant where the total internal pressure exceeds exterior ambient/atmospheric pressure ($\Delta P$) by 15% or more up to even 500% or 1,000% or more. Typically, such $\Delta P$ will result at internal composite temperature of about 150° F. and preferably above about 200° F. or more or, in case of higher temperature ammoniated complex compounds or select hydrated compounds or hydroxides, such temperatures can exceed 500° F., 1,000° F. or even reach 2,000° F. Suitable coating compositions include epoxy resin, phenolic resin, neoprene, vinyl polymers such as PBC, PBC vinyl acetate or vinyl butyral copolymers, fluoroplastics such as polychlorotrifluoroethylene, polytetrafluoroethylene, FEP fluoroplastics, polyvinylidene fluoride, chlorinated rubber, and metal films including steel alloys, aluminum and zinc coatings. The aforesaid list is by way of example, and is not intended to be exhaustive. Again, the coating may be applied to individual layers of substrate, and/or to a plurality of layers or to the outer, exposed surfaces of a plurality or stack of substrate layers. When different sorbents and/or different refrigerants are used each such composition is preferably sealed by sealant to avoid undesired migration of refrigerant from one sorbent to the other or mixing or displacement of one refrigerant with the other, Panels or other forms and geometries such as concave, convex or round shapes of the aforesaid coated substrate composites such as laminates are formed to the desired thickness. Moreover, such panels or laminates may also provide ballistic protection and may be installed in doors, sides, bottoms or tops of a vehicle, around ammunition, sensitive cargo, etc. to provide such protection as well as the above described cooling and fire extinguishing properties. Panels may also be shaped for other uses including personnel protection items and may be assembled in the form of cases, cylinders, boxes or containers for protection of ordnance, explosives, rockets, missiles, directed energy, such as laser beams or other materiel, fragile or sensitive items. Laminates may include layers of steel or other ballistic resistant material such as carbon fiber composites, boron carbide, aramid composites or metal alloys.

The aforesaid composites may be readily molded into articles having contoured and cylindrical shapes, specific examples of which include helmets, helmet panels or components, vests, vest panels as well as vehicle protection panels, vehicle body components, rocket or missile housings and rocket or missile containment units, including NLOS (non line of sight) systems. Such housings and containment units would encase and protect a rocket or missile and are used to store and/or fire missiles or rockets and could be constructed using the composites described herein to protect their contents from external objects such as bullets or bomb fragments. Vest panels of various sizes and shapes may be formed for being inserted into pockets located on or in the lining of existing or traditional military vests. The combined use of such panels with more traditional bulletproof vests may result in a lighter, more flexible, and more readily adaptable vest that accommodates the variety of sizes for different individuals. Similarly, one embodiment is a helmet panel that has been contoured to fit inside as a liner for a traditional helmet. In another embodiment, the protective composite panel is secured on the outside of the helmet with flexible and/or resilient helmet covers, netting, etc. In a different embodiment, the helmet may include one or more contoured or shaped composites as described herein to protect the wearer from bullets or bomb fragments. Again, water is the preferred refrigerant for such composites.

Panels of the aforesaid may be used for shielding soft shelters for personnel such as tents of various sizes and capacities including command posts as well as shelters for munitions, telecommunication equipment, etc. Release of refrigerant, such as water, from such panels may provide time for personnel to escape from a shelter exposed to heat from explosion or fire.

For penetration resistant vehicular armor, many different sized and shaped protection panels may be formed of the composite including floor, door, side and top panels as well as vehicle body components contoured in the shape of fenders, gas tank, engine and wheel protectors, hoods, and the like. As used herein, "vehicle" includes a variety of machines, including automobiles, tanks, trucks, helicopters, aircraft and the like. Thus, the penetration resistant vehicle armor may be used to protect the occupants or vital portions of any type of vehicle.

The aforesaid composite articles may also be combined with other ballistic and penetration resistant panels of various shapes and sizes. For example, the aforesaid composites may be paired with one or more layers or panels of materials such as steel, aramid resins, carbon fiber composites, boron carbide, or other such penetration resistant materials known to those skilled in the art including the use of two or more of the aforesaid materials, depending on the armor requirements of the penetration resistant articles required.

For composites mostly intended for non-ballistic and maximum thermal protection, additional refrigerant may be provided by incorporating spheres, compartments, packets or small reservoirs of pure liquid refrigerant or liquid refrigerant solutions in one or more layers, chambers or cavities with the most preferred refrigerant being water. The liquid containing layer or layers may be configured to release the liquid refrigerant or solution at the lowest temperature end the composite is designed and configured to provide protection for. The release of such refrigerants, e.g., water, ammonia, alcohols, amines, or refrigerant solution, e.g., alcohol-water, ammonia-water, aqueous brines, will occur when such a composite is exposed to elevated temperature causing internal refrigerant release and penetration, typically above 150° F. Such a modified composite must be designed to seal such liquid from the substrate/metal compound layers to prevent any such liquid from contacting, penetrating or permeating into the substrate under normal, typical ambient conditions. It is also important that the coating of adjacent layers prevents the released refrigerant from penetrating the coating and being reabsorbed onto the sorbent underneath the coating which would not only offset the cooling achieved via the evaporation of the refrigerant but adversely effect the system by generating the heat of absorption in the absorbing material thereby actually generating net heat due to exothermic reaction. If the composite incorporating such additional liquid refrigerant or refrigerant solution is to be used or exposed to conditions requiring ballistic protection, exterior panels, layers or other armor protection will be required to prevent exterior ballistic penetration of the composite.

What is claimed is:

1. A composite panel configured to release refrigerant therefrom, comprising:
    a substrate material comprising one or more layers of polarized fibers;
    a metal compound bonded to said substrate material comprising a complex compound of a polar gaseous refrigerant and a metal salt, and/or a hydrated metal hydroxide and/or a metal hydroxide; and
    a coating composition sealing at least one layer of said substrate material, and/or the exterior surface of said composite, and configured to prevent release of internal gaseous refrigerant therethrough at ambient temperatures and pressure and allow penetration and release of gaseous refrigerant at increased pressure within the composite panel.

2. The composite panel of claim 1, wherein the increased pressure is an internal gas pressure of 15% or more above exterior pressure.

3. The composite panel of claim 1, wherein said compound is at a concentration of at least about 0.3 grams/cc of open substrate material volume.

4. The composite panel of claim 1 comprising a panel of body armor configured to protect a person.

5. The composite panel of claim 4 wherein the polar gaseous refrigerant comprises water.

6. The composite panel of claim 1 comprising a structural panel configured to protect personnel and/or ordnance and/or heat sensitive items.

7. The composite panel of claim 6 wherein the polar gaseous refrigerant comprises water.

8. The composite panel of claim 7 wherein said composite further incorporates one or more layers containing liquid water or water solutions sealed from contact or permeation thereof into the substrate with the coating composition under ambient temperature conditions.

9. The composite panel of claim 1 wherein said composite further incorporates one or more layers containing liquid water or water solutions sealed from contact or permeation thereof into the substrate with the coating composition under ambient temperature conditions.

10. The composite panel of claim 1 wherein the panel comprises a vehicle protection panel.

11. The composite panel of claim 1 wherein the panel comprises a vehicle body component.

12. The composite panel of claim 1 wherein the fibers comprise glass, polyamide, polyphenylene sulfide, carbon or graphite or combinations of two or more thereof.

13. The composite panel of claim 1 wherein the metal compound comprises alkali metal, alkaline earth metal, transition metal, zinc, cadmium, tin, aluminum or combinations of two or more thereof.

14. The composite panel of claim 1 wherein the polar gaseous refrigerant comprises ammonia, alcohol, amine, or water.

15. The composite panel of claim 1 wherein said fibers are woven, layered or intertwined strands of fibers or combinations of two or more thereof.

16. The composite panel of claim 1 wherein the polarized fibers comprise aromatic polyamide resin fibers.

17. The composite panel of claim 1 comprising a panel or shaped article configured to protect ordnance.

18. The composite panel of claim 1 comprising a soft shelter and wherein said polar gas refrigerant comprises water.

19. The composite panel of claim 18 wherein said composite further incorporates one or more layers containing liquid water or water solutions sealed from contact or permeation thereof into the substrate with the coating composition under ambient temperature conditions.

20. The composite panel of claim 1 configured to release refrigerant therefrom at progressively elevated temperatures comprising a first portion of said substrate material having a first complex compound bonded thereon capable of releasing refrigerant in a first temperature range, and a second portion of said substrate material having a second complex compound bonded thereon capable of releasing refrigerant in a second temperature range, higher than said first temperature range.

21. The composite panel of claim 20 further comprising a third portion of said substrate material having a hydrated metal hydroxide or a metal hydroxide bonded thereon capable of releasing refrigerant in a third temperature range, higher than said first and second temperature ranges.

22. The composite panel of claim 1 configured to release refrigerant therefrom at successively elevated temperatures comprising a first portion of said substrate material having a complex compound bonded thereon capable of releasing refrigerant in a first temperature range, and a second portion of said substrate material having a hydrated metal hydroxide or a metal hydroxide bonded thereon capable of releasing refrigerant in a second temperature range, higher than said first temperature range.

* * * * *